Oct. 2, 1928.  
W. H. FENNEMAN  
1,686,079  
WRIST PIN BEARING HOLDER  
Filed Jan. 6, 1927
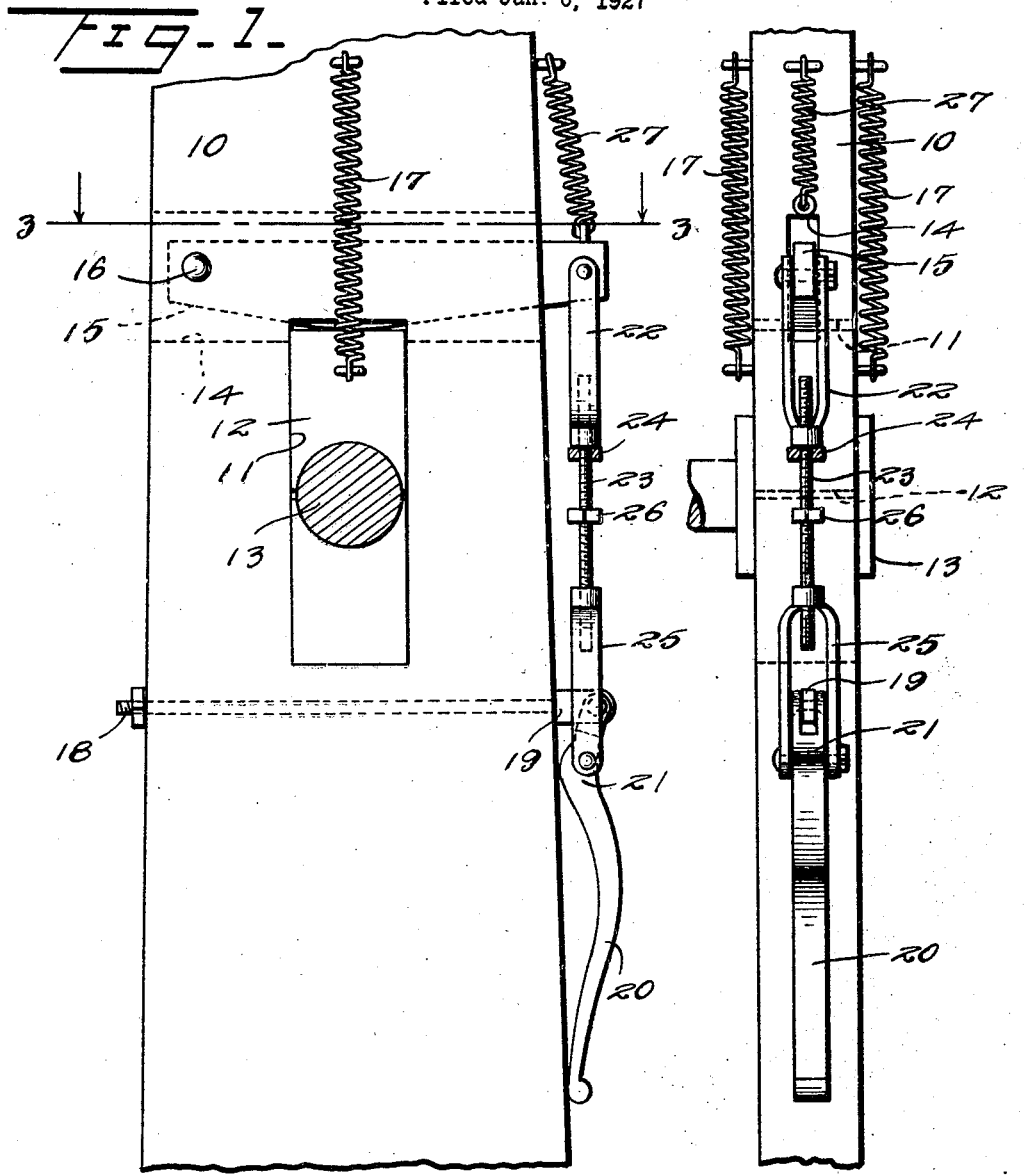
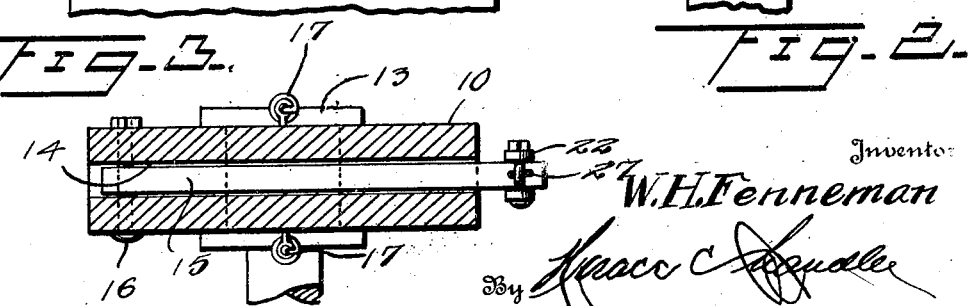
Inventor  
W. H. Fenneman  
By Horace C. Snudler  
Attorney Patented Oct. 2, 1928.

1,686,079

UNITED STATES PATENT OFFICE.

WILLIAM H. FENNEMAN, OF TAFT, CALIFORNIA, ASSIGNOR TO MARY KATHERINE FENNEMAN.

WRIST-PIN-BEARING HOLDER.

Application filed January 6, 1927. Serial No. 159,452.

This invention relates to new and useful improvement in pitmans and wrist-pin bearings, and particularly such devices used in well drilling rigs.

The wrist-pin bearing is ordinarily held against the wrist-pin by means of a wooden wedge, but in view of the fact that this wedge is driven out and driven in a number of times, during the drilling of a well, such wedge is broken, and replaced several times.

The principal object of the present invention is to provide a novel and improved means for holding the bearing in proper engagement with the wrist-pin, and which will quickly release the bearing, to permit removal of the pitman from the wrist-pin.

Another object is to provide a device of this character which will firmly hold the bearing in place, and which is equipped with means for holding the holding means out of the way, when removing the pitman from the wrist-pin, such bearing being also provided with means for holding it out of engagement with the pin, while removing the pitman, or restoring the same to position.

Other objects and advantages will be apparent from the following description, when taken in connection with the accompanying drawing.

In the drawing:

Figure 1 is an elevation of a portion of a pitman, showing the bearing holding means in operative position, the pitman being broken away.

Figure 2 is a side view of the same.

Figure 3 is a horizontal sectional view on the line 3—3 of Figure 1.

Referring particularly to the accompanying drawing, 10 represents a portion of the pitman of a well drilling rig, having the wrist-pin receiving opening 11, therein, and the bearing block 12 seated in said opening and bearing on said wrist-pin 13. Formed transversely through the pitman, above the opening 11 is an opening 14, and disposed in said opening is the bearing engaging arm 15, said arm being pivotally supported in the opening by means of the bolt 16. The opening 14 is of sufficient width to permit a limited vertical swinging movement of the arm. The upper end of the opening 11 communicates with the intermediate portion of the lower side of the opening 14, whereby the bearing block is arranged to be engaged by the lower edge face of said arm. On each of the wider faces of the pitman there is arranged a coil spring 17, each having its upper end secured to the pitman, and its lower end secured to the bearing block 12. Disposed through the pitman, below the opening 11, and in parallel relation thereto, is a bolt 18, one end of which is formed with an eye 19, to which is pivotally connected one end of a lever 20. This lever is formed with a bend 21 which is arranged to pass inwardly of the pivot of the lever, when said lever is moved against the edge face of the pitman. Pivotally connected to the free end of the arm 15, which projects beyond the end of the opening 14, is a yoke 22, and engaged in the bight of said yoke is one end of the oppositely threaded adjusting screw 23. A locking nut 24 is engaged on the said end of the screw, and is arranged to be rotated into frictional engagement with the adjacent end of the yoke 22, to maintain the screw in adjusted position. Pivotally connected to the angle of the before-mentioned bend 21 is a yoke 25, and threaded into the bight portion thereof is the other end of the screw 23, an integral wrench engaging nut portion 26 being formed on the intermediate portion of the screw whereby to permit rotary movement thereof. Connected to the free end of the arm 15, and to the pitman, above the opening 14, is a coil spring 27, which serves to hold the arm in elevated position while the pitman is being removed from, or replaced on the wrist-pin.

When the screw has been properly adjusted, and the lever 20 swung upwardly, the spring 27 will hold the arm 15 in elevated poistion, while at the same time, the springs 17 will lift the bearing block 12, so that the pitman 10 may be easily and quickly removed from the wrist-pin, or replaced thereon. Upon swinging the lever 20 downwardly against the edge of the pitman, the arm 15 will be drawn down to force the bearing block firmly against the wrist-pin, and by reason of the construction of the lever 20, and its connection with the yoke 25, the pivot connection of said yoke will be thrown off center whereby to hold the lever against accidental outward swinging, which would tend to release the arm from the bearing block.

What is claimed is:

A pitman having an upper wrist-pin opening, a bearing block in the opening, a transverse opening intersecting the upper end of the wrist-pin opening, means for normally urging the block into the transverse opening, an arm pivotally supported in the transverse opening and having a convex face bearing on the upper end of the block, resilient means for normally urging the arm away from the block, an eye bolt disposed transversely through the pitman beneath the bearing block opening, a bent lever pivotally mounted on the eye bolt, a yoke pivotally connected to the free end of the said arm, a yoke pivotally connected with the lever adjacent its pivotal connection with the eye bolt, and an oppositely threaded bolt engaged in the adjacent ends of said yokes.

In testimony whereof, I affix my signature.

WILLIAM H. FENNEMAN.